Nov. 4, 1924.  
L. A. GILBERT  
1,513,981  
TRANSMISSION MECHANISM  
Filed Feb. 7, 1923  
2 Sheets-Sheet 2
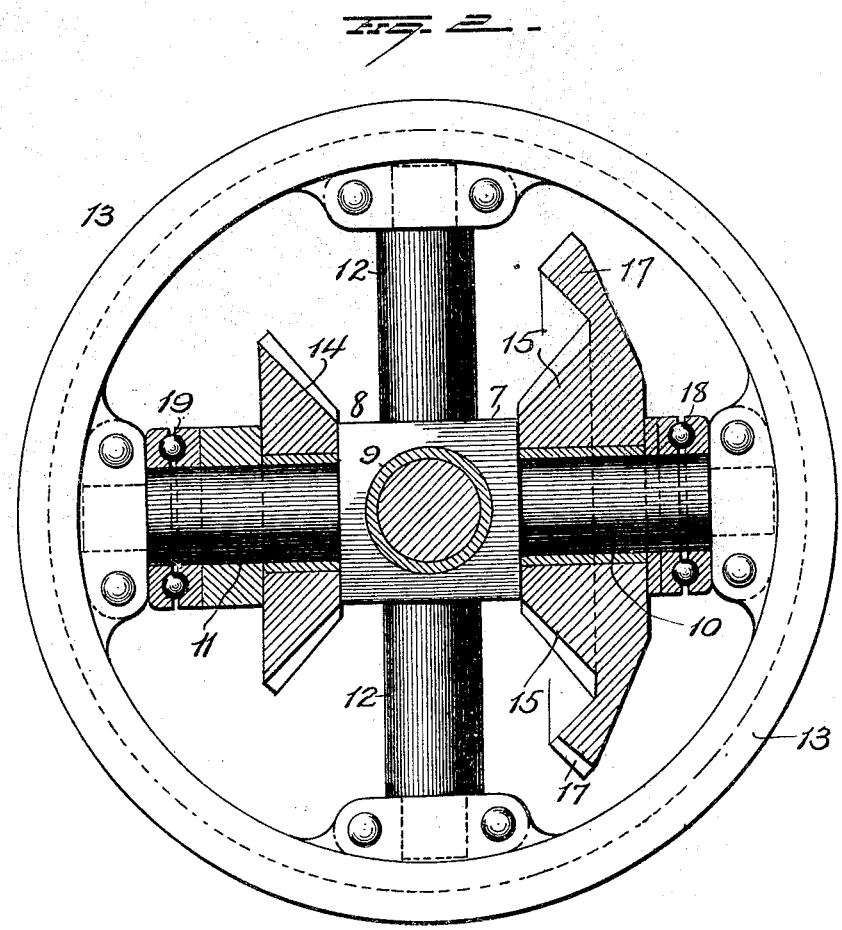

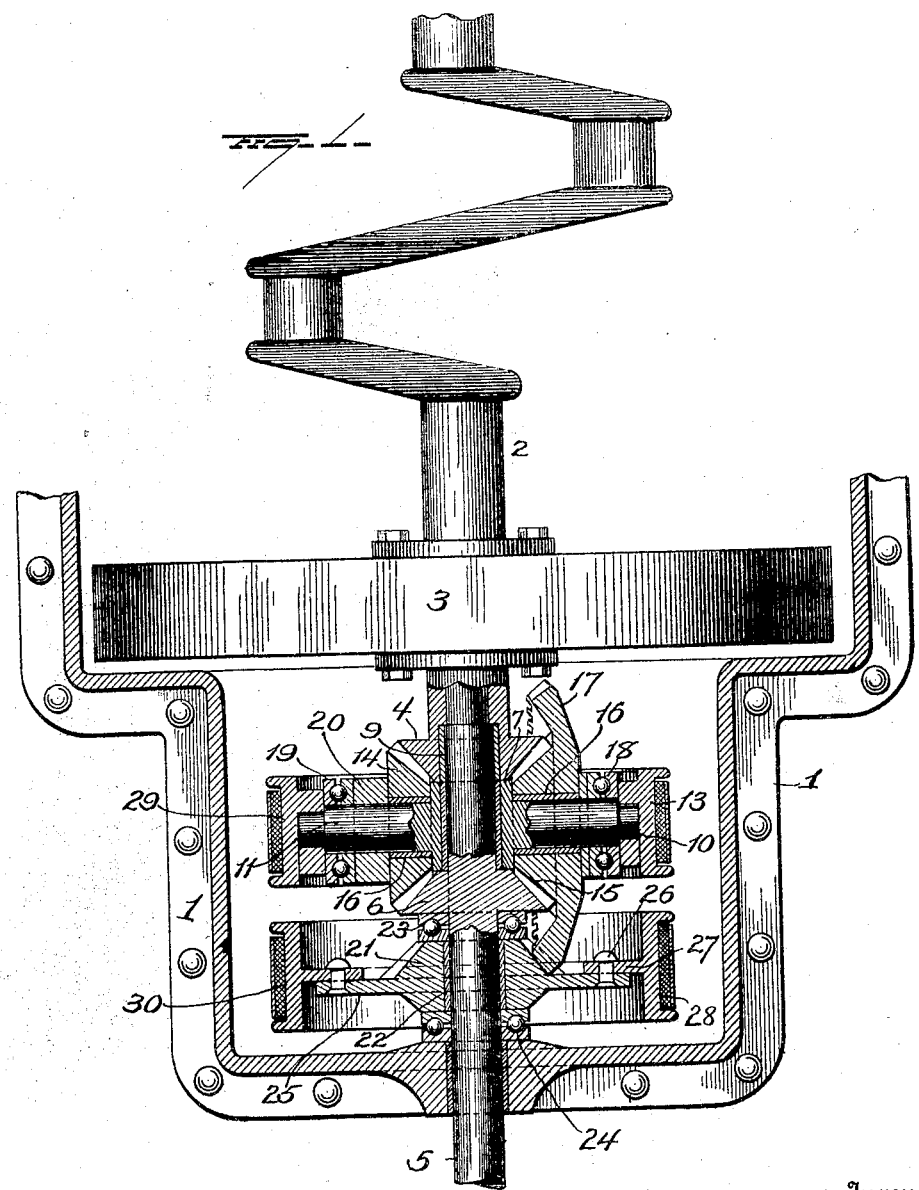

Patented Nov. 4, 1924.

1,513,981

UNITED STATES PATENT OFFICE.

LEO A. GILBERT, OF BALTIMORE, MARYLAND, ASSIGNOR OF ONE-HALF TO PHILIP F. GILBERT, OF BALTIMORE, MARYLAND, AND ONE-FOURTH TO HENRY CLILVERD, OF DAVENPORT, IOWA.

TRANSMISSION MECHANISM.

Application filed February 7, 1923. Serial No. 617,629.

*To all whom it may concern:*

Be it known that I, LEO A. GILBERT, a citizen of the United States, of Baltimore, in the county of Baltimore and State of Maryland, have invented certain new and useful Improvements in Transmission Mechanism; and I do hereby declare the following to be a full, clear, and exact description of the invention, such as will enable others skilled in the art to which it appertains to make and use the same.

My invention relates to improvements in power transmission mechanism, one object of the invention being to so construct and arrange such mechanism that the driven shaft may be permitted to run idly or caused to rotate in either direction or at any desired speed while the driving shaft is in motion and without necessitating the shifting of gears relatively to each other.

With these and other objects in view, the invention consists in certain novel features of construction and combinations of parts as hereinafter set forth and pointed out in the claims.

In the accompanying drawings;

Figure 1 is a view partly in section and partly in elevation showing an embodiment of my invention, and Figure 2 is a view partly in transverse section and partly in elevation taken at right angles to Figure 1 and on a larger scale, and showing parts of the gearing.

My improved transmission mechanism is adaptable for use in driving any machine as may be desired but for convenience in explaining the same, it may be assumed that the transmission is adapted for use in connection with the driving of an automobile.

In Figure 1 of the drawing, I have shown a portion of a frame at 1, which may be the transmission casing for an automobile, and the engine or driving shaft is shown at 2. The driving shaft may have a fly wheel 3 rigidly secured thereto and also secured to said fly wheel (at the opposite side thereof) is the elongated hub portion of a bevel gear 4. One end portion of a driven shaft 5 is loosely mounted axially in the gear 4 and passes through one end of the casing 1, and said driven shaft carries a fixed bevel gear 6 (preferably integral with said shaft) disposed opposite and spaced from the driving gear 4, the axes of these gears thus being in alignment with each other and coincident with the axes of the driving and driven shafts.

The hub portion 7 of a frame or spider or carrier 8 is loosely mounted on the driven shaft 5 and a bushing 9 may be interposed between said shaft and the hub portion 7 of the spider and the gear 4. The spider 8 includes a plurality of (preferably four) arms 10—11 and 12,—the outer ends of said arms having a brake wheel 13 secured thereto. Compensating bevel gears 14 and 15 are mounted loosely on the respective arms 10 and 11 and are in constant mesh with the bevel gears 4 and 6,—and suitable bushings 16 are provided for said gears 14 and 15. A differential gearing is thus formed. A larger bevel gear 17 is rigid with the gear 15 (preferably integral therewith) and between this gear and the brake wheel 13, anti-friction bearing devices 18 are interposed. Anti-friction bearing devices 19 may also be interposed between the brake wheel 13 and a spacer 20 on the arm 11, said spacer being interposed between the bearing devices 19 and the gear 14.

A bevel gear 21 (approximately the same in size as the gears 4 and 6) is loosely mounted on the driven shaft 5 and an interposed bushing 22 may be provided for this gear. Anti-friction bearing devices 23 may be interposed on the shaft 5, between the gears 6 and 21, and similar anti-friction devices 24 may be interposed between the gear 21 and the casing 1.

The bevel gear 21 is constructed with a flange 25 secured by rivets 26 to a flange or rib 27 on the inner circumference of a brake wheel 28, the latter being thus carried by and rigid with the bevel gear 21.

A brake band 29 is provided for the brake wheel 13 and a similar brake band 30 is provided for the brake wheel 28. Each of these brake bands may be operated and controlled by any suitable devices (not shown) for tightening and loosening them.

When the gearing is employed in driving mechanism for an automobile, the driven shaft may be so geared to the wheels that backward rotation of said shaft will cause forward rotation of the wheels, and so that forward rotation of said shaft will cause backward rotation of the wheels. These results may be accomplished with the use of differential gearing between the driven shaft and the wheels, with the gear on the driven shaft disposed at the right side of the crown gear of said differential, viewing the same from the front end of the automobile.

With the construction and arrangement of transmission mechanism hereinbefore described and shown in the drawings, it will be seen that when the bands of both brakes are loose and the driving shaft is in motion, the spider will be caused to rotate and therefore the gears 14, 15 and 17 will be made to revolve around the axis of the driven shaft and no motion will be imparted to the driven shaft, the gear 21 being loose on said driven shaft. Should the brake band 29 be now tightened on the brake wheel 13 to retard or prevent the rotation of the same and the spider which carries the compensating gears 14 and 15, motion will be imparted by the gear 4 to the gears 14 and 15 to rotate the same on their axes and these gears will transmit motion to the gear 6 and cause the latter and the driven shaft to rotate opposite the direction of rotation of the driving shaft 2 and the driving gear 4. Should the driven shaft be geared to the wheels of a vehicle in the manner previously described, motion would be imparted to said wheels to drive the vehicle forwardly. It will be understood that the forward speed of the driven shaft may be readily varied and controlled by varying the braking force applied to the spider which carries the gears 14 and 15.

Should it be desired to reverse the direction of rotation of the driven shaft while the driving shaft is in motion, the operator would first loosen the brake band 29 so as to free the brake wheel 13 and spider 8, and afterwards tighten the brake band 30 on the brake wheel 28 carried by the normally loose gear 21. The large gear 17 will now be permitted to revolve with the spider or carrier about the axis of the latter but as the gear 21 with which the gear 17 meshes, is held against rotation or its rotation retarded by application of the braking means and the gear 15 is in mesh with the gear 6, the result will be that the driven shaft will be caused to rotate in the same direction as that of the driving shaft. The speed of rotation of the driven shaft in such direction may be varied and controlled by varying the degree of breaking force which may be applied to the gear 21.

My improved transmission mechanism is applicable for use for controlling the operation of machinery of various types as well as for use in the driving mechanism of automobiles.

Various slight changes might be made in the details of construction of my invention without departing from the spirit thereof or limiting its scope, and hence I do not restrict myself to the precise details herein set forth.

Having fully described my invention what I claim as new and desire to secure by Letters Patent, is:—

1. Transmission mechanism comprising axially aligned driving and driven shafts, a series of constantly meshing gears constituting a differential gearing connecting the shafts and including opposed gears fixed upon the respective shafts, a spider rotatably mounted on one of the shafts between said fixed gears and carrying the intermediate gears of the differential gearing, a gear concentric with and fixed to one of said intermediate gears, a gear loose on the driven shaft and constantly in mesh with the last-mentioned gear, and brake devices controlling the rotation of the spider and said loose gear.

2. Transmission gearing comprising axially aligned driving and driven shafts, opposed gears fixed upon the meeting ends of the respective shafts, a spider rotatably mounted about the axes of the shafts between said fixed gears, compensating gears rotatably mounted diametrically opposite arms of the spider and constantly meshing with both said fixed gears, a gear loosely mounted on the driven shaft, a gear fixed to and concentric with one of the compensating gears and constantly in mesh with said loosely mounted gear, a brake wheel connected with and encircling the loosely mounted gear, a brake wheel secured to and encircling the spider and the gears cooperating therewith, and means cooperating with the respective brake wheels to control the rotation of the same.

In testimony whereof, I have signed this specification in the presence of two subscribing witnesses.

LEO A. GILBERT.

Witnesses:
W. S. HODGE,
R. S. FERGUSON.